United States Patent
Phillips

(10) Patent No.: US 7,255,720 B2
(45) Date of Patent: Aug. 14, 2007

(54) METHODS FOR PRODUCTION OF ZINC OXIDE ELECTRODES FOR ALKALINE BATTERIES

(75) Inventor: Jeffrey Phillips, Santa Clara, CA (US)

(73) Assignee: PowerGenix Systems, Inc., Whitehorse, Yukon (CA)

( * ) Notice: Subject to any disclaimer, the term of this patent is extended or adjusted under 35 U.S.C. 154(b) by 485 days.

(21) Appl. No.: 10/471,485

(22) PCT Filed: Mar. 15, 2002

(86) PCT No.: PCT/CA02/00352

§ 371 (c)(1),
(2), (4) Date: Jan. 20, 2004

(87) PCT Pub. No.: WO02/075825

PCT Pub. Date: Sep. 26, 2002

(65) Prior Publication Data

US 2004/0115533 A1      Jun. 17, 2004

Related U.S. Application Data

(60) Provisional application No. 60/276,344, filed on Mar. 15, 2001.

(51) Int. Cl.
*H01M 4/48* (2006.01)
(52) U.S. Cl. ..................... 29/623.5; 429/231
(58) Field of Classification Search ................ 29/623.5
See application file for complete search history.

(56) References Cited

U.S. PATENT DOCUMENTS

| | | | |
|---|---|---|---|
| 3,645,793 A | 2/1972 | Hein et al. | |
| 3,951,687 A | 4/1976 | Takamura et al. | |
| 4,224,391 A | 9/1980 | Eisenberg | |
| 4,358,517 A | 11/1982 | Jones | |
| 5,215,836 A | 6/1993 | Eisenberg | |
| 5,302,475 A | 4/1994 | Adler et al. | |
| 5,308,374 A * | 5/1994 | Yoshizawa et al. | ........ 29/623.1 |
| 5,401,590 A * | 3/1995 | Chalilpoyil et al. | .......... 429/59 |
| 5,697,145 A | 12/1997 | Fukumura et al. | |
| 5,863,676 A | 1/1999 | Charkey et al. | |

FOREIGN PATENT DOCUMENTS

WO      WO98/44579      10/1998

OTHER PUBLICATIONS

Gagnon et al., "Pasted-Rolled Zinc Electrodes Containing Calcium Hydroxide for Use in Zn/NiOOH Cells," Journal of the Electrochemical Society, vol. 134, No. 9, 2091-2096 (1987).

* cited by examiner

*Primary Examiner*—Gregg Cantelmo
(74) *Attorney, Agent, or Firm*—Beaver Weaver LLP.

(57) ABSTRACT

A zinc electrode for use in alkaline batteries comprises a mixture of 0.425 to 1.55 volume parts of zinc oxide with a volume part of a metallic oxide chosen from the group consisting of: calcium oxide, barium oxide, and mixtures thereof, together with hydroxy-ethyl cellulose, an oxide dispersant chosen from the group consisting of: soap derivatives, anionic polyelectrolytes, anionic surfactants, and mixtures thereof, and a binder. The electrode is prepared by mixing zinc oxide with the chosen metallic oxide in an aqueous medium such as water or potassium hydroxide, stirring overnight, filtering and drying the mixture, optionally adding a further small amount of zinc oxide, optionally adding other metallic oxides, and adding hydroxy-ethyl cellulose, an oxide dispersant, and a binder. The aqueous paste os slurry thus formed is placed on a conductive substrate, drawn through a sizing gap, cut and dried, to form low cost pasted zinc oxide electrodes.

14 Claims, No Drawings

METHODS FOR PRODUCTION OF ZINC OXIDE ELECTRODES FOR ALKALINE BATTERIES

CROSS-REFERENCE TO RELATED APPLICATIONS

This application claims the benefit of U.S. Provisional Patent Application No. 60/276,344 filed Mar. 15, 2001 for Jeffrey Phillips and titled "Methods for Production of Zinc Oxide Electrodes for Alkaline Batteries," through International Application No. PCT/CA02/00352 filed Mar. 15, 2002.

FIELD OF THE INVENTION

This invention relates to zinc oxide electrodes for use in alkaline batteries, and provides methods for production of such zinc oxide electrodes as well as the formulations thereof. Particularly, the present invention provides for the low cost production of pasted zinc negative electrodes.

BACKGROUND OF THE INVENTION

A conundrum develops with respect to the use of zinc electrodes in high rate, high performance batteries. On the one hand, the use of zinc electrodes provides low cost negative electrodes. On the other hand, when such electrodes are pasted, as is usually the case, they are very difficult and very expensive to make, especially when steps are taken to avoid shape change as will inevitably occur while the zinc electrode is cycled during the life of the rechargeable battery in which it is placed.

The present inventor has unexpectedly discovered that mass production of environmentally benign zinc electrodes can be provided for, by adapting certain aqueous pasting techniques, and by the provision of a stable zinc-based slurry or paste which particularly has an additional oxide of calcium, magnesium, or barium included therein for purposes of stability.

It is well known that rechargeable batteries having zinc electrodes have the advantage of using a low cost negative electrode. Of course, they also provide high voltage, and light weight.

On the other hand, the zinc electrode in alkaline batteries will exhibit some solubility in most alkaline electrolytes, resulting in the loss of integrity of the zinc electrode as the battery is cycled. This phenomenon of zinc electrode disfigurement is well known, and is referred to in the industry as shape change.

Many approaches have been taken to control shape change. The most successful attempts have limited the solubility of the zinc electrode, so as to thereby reduce its ability to migrate.

For example, EISENBERG U.S. Pat. No. 4,224,391, issued Sep. 23, 1980, and U.S. Pat. No. 5,215,836 issued Jun. 1, 1993, each provides electrolyte formulations that employ mixtures of potassium hydroxide and boric acid, phosphoric acid, or arsenic acid. The purpose, in all events, is to limit the solubility of the zinc electrode.

Another approach is that taken by ADLER et al in U.S. Pat. No. 5,302,475, issued Apr. 12, 1994. In that patent, the inventors teach an electrolyte which contains potassium hydroxide and a combination of potassium fluoride and potassium carbonate salts. The zinc electrode is reported to exhibit low shape change.

Yet another approach which is known to the inventor, is the addition of material such as calcium oxide to the electrode itself. This approach will modify the chemical composition of the discharge product to effectively lower the concentration of the zinc ion in the solution. However, in order to do so a method must be devised whereby a calcium zincate water based paste or slurry is manufactured, for pasting into the conductive substrate of a zinc electrode.

Moreover, the method by which the zinc electrode is manufactured may have significant effect upon cycle performance of the battery. A number of preparation processes have been used to further optimise the performance of zinc electrodes. They include powder pressing as taught by HEIN et al U.S. Pat. No. 3,645,793, issued Feb. 29, 1972. In that patent, the inventors teach pressing metallic powder into highly porous metallic battery electrodes structures, and the powders are first cleaned by the action of mild acids prior to and during the pressing operation.

Another approach is that taken by CHARKEY et al in U.S. Pat. No. 5,863,676, issued Jan. 26, 1999. Here, a non-aqueous sheet formation is employed, where a calcium zincate constituent is formed external of the battery, and then placed in the battery in layers.

However, any process which employs a pasting operation is difficult to control as far as managing the "set" time during pasting is concerned. This is reported in a paper entitled *Pasted-Rolled Zinc Electrodes Containing Calcium Hydroxide for Use in Zn/NiOOH Cells* by Gagnon et al, published in the *Journal of the Electrochemical Society*, September 1987, at pages 2091 to 2096. It is reported at page 2092 that the electrode fabrication was carried out in such a manner that the same amount of paste is added to both sides of a grid, by sandwiching the paste between backing papers and passing it through rollers to make a thin film. Thereafter, the current collector was placed between 2 films, and the composite was pressed to make a zinc electrode. This provided a longer set-time in which to paste the electrodes, and adhered the paste to the current collector grid in satisfactory manner. The thickness of the electrode, and therefore the zinc loading density, was controlled by the gap between the rollers.

Regrettably, none of the above mentioned processes can be readily transferred to mass production techniques, for high rate production of zinc electrodes for use in high performance batteries. Therefore, it has not been possible to provide a commercial product at a reasonable price, even though the chemical problems of the shape change of the zinc electrode have been effectively resolved.

The present invention provides a method for mass production of any environmentally benign zinc electrode, where the electrode will demonstrate excellent mechanical characteristics, good rate capability, and high cycle life, without significant shape change.

Indeed, the methods of the present invention may be readily and easily adaptable to all rechargeable zinc battery production, so that in time low cost zinc-based batteries may be manufactured in substantial quantities, and thereby replace toxic cadmium-based batteries. Such cadmium-based batteries enjoy a strong market position, even now, due to their relatively low cost, notwithstanding their toxicity and notwithstanding memory effect, and the like.

It is very difficult to uniformly coat an aqueous paste of zinc oxide onto a metallic current collector. When calcium oxide or calcium hydroxide is added to the mix, the problem of uniformly coating an aqueous paste zinc oxide onto a metallic current collector is even more difficult.

These problems come as a consequence of the rapid solidification which may prevent further work with the mix, or the final pasted plate may be structurally unsound in such a manner that further handling is impossible.

These problems, of course, have lead to non-standard manufacturing techniques in the manufacturer of zinc electrodes, thereby adding to the costs of the manufacture of the zinc electrodes. However, if a successful adoption of aqueous based manufacturing techniques such as those which are applied to cadmium electrodes could be developed for zinc-based electrodes, then a reliance on toxic cadmium-based batteries would be overcome.

The present invention provides such a solution. In keeping with the present invention, it is possible to manufacture a continuous coated electrode without setting problems, and to provide a mechanically sound electrode. Briefly, the present invention provides for a calcium zincate or other precursor constituent for an aqueous solution, based primarily on mixtures of zinc oxide with calcium oxide, magnesium oxide, or barium oxide, together with further optional metal oxides, and appropriate pasting constituents as a cellulose compound, a dispersant, and a binder.

SUMMARY OF THE INVENTION

To that end, the present invention provides both a method for production of zinc oxide electrodes, and the zinc oxide electrodes themselves, for use in alkaline batteries. The method comprises the following steps:

(a) Preparing an aqueous suspension of a metallic oxide chosen from the group consisting of: calcium oxide, magnesium oxide, barium oxide, and mixtures thereof, by placing 0.1 to 2.0 volume parts of the chosen metallic oxide in 20 volume parts of an aqueous medium chosen from the group consisting of: water, and a 20% potassium hydroxide solution. The chosen metallic oxide in the aqueous medium is stirred vigorously so as to form a suspension.

(b) Adding zinc oxide to the suspension, in an amount of 0.4 to 1.5 times the volume of the chosen metallic oxide in the suspension.

(c) Stirring the suspension for a period of 1 to 12 hours.

(d) Filtering the stirred mixture.

(e) Drying the filter mixture at a temperature of 45° C. to 75° C., to form a powder mixture.

(f) Adding an additional 0.025 to 0.05 volume parts of zinc oxide to the powdered mixture.

(g) Optionally, adding a further 0.01 to 0.04 volume parts of a further metallic oxide chosen from the group consisting of: bismuth oxide, indium oxide, tin oxide, and mixtures thereof, to the powdered mixture.

(h) Preparing an aqueous paste of the powdered mixture, by adding hydroxy-ethyl cellulose, an oxide dispersant chosen from the group consisting of: soap derivatives, anionic polyelectrolytes, anionic surfactants, and mixtures thereof, together with a liquid binder, to the powdered mixture.

(i) Coating or pasting the aqueous paste thus formed onto a conductive substrate.

(j) Drawing the coated or pasted conductive substrate through a gap having a predetermined dimension so as to fix the thickness of the electrode being manufactured.

(k) Drying and cutting the electrode to size.

In keeping with provisions of the present invention, the aqueous medium may be water, or it may be potassium hydroxide solution, as noted. When the aqueous medium is water, then step (c) is carried out at room temperature. However, when the aqueous medium is potassium hydroxide solution, then step (c) is carried out at 50° C. to 75° C.

Typically, the liquid binder provided in the formulation for zinc electrodes in keeping with the present invention, is dispersed PTFE.

The present invention also provides for a zinc electrode for use in alkaline batteries, which zinc electrode is characterised by a mixture of 0.425 to 1.55 volume parts of zinc oxide with 1 volume part of a metallic oxide chosen from the group consisting of: calcium oxide, magnesium oxide, barium oxide, and mixtures thereof, together with hydroxyethyl cellulose, an oxide dispersant chosen from the group consisting of: soap derivatives, anionic polyelectrolytes, anionic surfactants, and mixtures thereof, and also together with a binder.

Again, typically, the binder is dispersed PTFE.

The zinc electrode of the present invention may further comprise 0.01 to 0.04 volume parts of a further metallic oxide chosen from the group consisting of: bismuth oxide, indium oxide, tin oxide, and mixtures thereof.

DETAILED DESCRIPTION OF THE PREFERRED EMBODIMENTS

The novel features which are believed to be characteristic of the present invention, as to its structure, organization, use and method of operation, together with further objectives and advantages thereof, will be better understood from the following discussion.

Several examples now follow showing specific utilization of particular selected constituent components of zinc electrodes, and the method of making the same, in keeping with the present invention.

EXAMPLE 1

100 grams of calcium oxide was added to about 2 liters of water, so as to form a suspension. The suspension was then stirred vigorously.

Thereafter, approximately 250 grams of zinc oxide—about 2.5 times the weight of calcium oxide—was then added to the suspension. It will be seen that approximately 0.32 volume part of calcium oxide and approximately 0.47 volume parts of zinc oxide were employed.

The suspension was then continuously stirred overnight, at room temperature.

Thereafter, the solid mixture from the suspension was filtered, and dried at 60° C.

Then, another approximately 20 grams of zinc oxide was added to the powdered mixture of zinc oxide and calcium oxide—being another approximately 0.04 volume parts, for a total of about 0.51 volume parts of zinc oxide.

Also, approximately 28 grams of bismuth oxide—about 0.01 volume parts—was added to the powdered mixture.

Then, a smooth paste was prepared by adding hydroxyethyl cellulose, and a dispersant. Various dispersants were used, including soap derivatives, anionic polyelectrolytes, anionic surfactants, and other surface active agents.

Finally, a liquid binder—in this case, dispersed PTFE—was added.

EXAMPLE 2

In a second test, calcium oxide and zinc oxide were mixed in the same proportion as noted above, but they were added to a 20% potassium hydroxide solution. This mixture was then heated to 60° C. and stirred overnight to promote the formation of calcium zincate.

Thereafter, the mix was filtered and dried at 60° C.; an additional small amount of zinc oxide, and an additional amount of bismuth oxide, were also added to the mix, in the same manner as set forth in Example 1.

The mixes from both of the examples noted above were then formed into a smooth paste or slurry.

Thereafter, the paste or slurry was coated onto a suitable substrate such as perforated metal, or pasted into a suitable substrate, in known manner.

However, typically, the mix was prepared as a slurry coat, and the substrate metal was drawn through the paste or slurry, and through a precision gap of known dimension, so as to control the thickness of the electrode being manufactured.

Thereafter, the pasted electrode were dried, cut to size, provided with an electrical contact, and assembled into electrochemical cells. For purposes of the tests conducted in keeping with the present teachings, the cells had pasted nickel positive electrodes, and were filled with an electrolyte having 20% potassium hydroxide and 2% lithium hydroxide.

The test cells were cycled and tested for rate capability and cycle performance, and were found to perform well, without significant shape change of the negative electrode.

Thus, the present invention provides for the use of an aqueous suspension of zinc oxide together with calcium oxide, magnesium oxide, or barium oxide, or mixtures thereof. The aqueous medium may be water or potassium hydroxide.

Additional metal oxides such as bismuth oxide, indium oxide, tin oxide, and mixtures thereof, may also be provided in the aqueous paste preparation, whereby further dimensional stability of the electrode is assured during repeated cycling operations.

As noted, typical cellulose compounds, dispersants, and binders, of the sort well known in the art, are employed with the inventive mixture, in the preparation of a paste or slurry. However, because the paste or slurry is aqueous, and the pasting or coating operation can be carried out at room temperature, then the set time for the paste is less of a problem then hitherto experienced.

Methods of preparation of zinc electrodes for alkaline batteries, and the zinc electrodes per se, have been described above. It will be recognised by those skilled in the art that other modification can be made without departing from the spirit and scope of the appended claims.

For example, discussion of approximate volume part measurements is intended to suggest that there is no specific preciseness or exactitude, and that in any event the weight of equal volume parts of differing metallic oxides will vary as a consequence of the differing atomic weights of the metals being employed.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

What is claimed is:

1. A method for production of zinc oxide electrodes for use in alkaline batteries characterized by the steps of:
    a) preparing an aqueous suspension of a metallic oxide chosen from the group consisting of: calcium oxide by placing the chosen metallic oxide in an aqueous medium to form the aqueous suspension;
    b) adding zinc oxide to the aqueous medium of the chosen metallic oxide;
    c) stirring the aqueous suspension to promote formation of calcium zincate;
    d) drying the stirred mixture;
    e) preparing an aqueous paste or slurry comprising the dried mixture from d), an oxide dispersant, and a liquid binder and
    f) coating or pasting the aqueous paste or slurry onto a conductive substrate.

2. The method of claim 1, wherein when said aqueous medium is water, step (c) is carried out at room temperature; and when said aqueous medium is potassium hydroxide solution, step (c) is carried at 50° C. to 75° C.

3. The method of claim 1, wherein said liquid binder is dispersed PTFE.

4. The method of claim 1, wherein the aqueous medium employed in a) comprises water or a potassium hydroxide solution.

5. The method of claim 1, wherein a) comprises placing 0.1 to 2.0 volume parts of the chosen metallic oxide in 20 volume parts of the aqueous medium.

6. The method of claim 1, wherein b) comprises adding zinc oxide to the aqueous suspension in an amount of 0.4 to 1.5 times the volume of the chosen metallic oxide in the suspension.

7. The method of claim 1, wherein c) comprises stirring the aqueous suspension for a period of 1 to 12 hours.

8. The method of claim 1, wherein d) comprises:
    filtering the stirred mixture;
    drying the filtered mixture at a temperature of 45° C. to 75° C. to form a powdered mixture.

9. The method of claim 1, further comprising adding an additional 0.025 to 0.05 volume parts of zinc oxide to the dried mixture.

10. The method of claim 1, further comprising adding a further metallic oxide chosen from the group consisting of: bismuth oxide, indium oxide, tin oxide, and mixtures thereof, to the dried mixture.

11. The method of claim 1, wherein the oxide dispersant is selected from the group consisting of: anionic polyelectrolytes, anionic surfactants, and mixtures thereof.

12. The method of claim 1, wherein the aqueous paste or slurry further comprises a cellulose compound.

13. The method of claim 12, wherein the cellulose compound is hydroxyl-ethyl cellulose.

14. The method of claim 1, further comprising:
    g) drawing the coated or pasted conductive substrate through a gap having a predetermined dimension so as to fix the thickness of the electrode being manufactured; and
    h) drying and cutting the electrode to size.

* * * * *